(12) United States Patent
Oikawa et al.

(10) Patent No.: US 9,721,698 B2
(45) Date of Patent: Aug. 1, 2017

(54) WIRE HARNESS

(71) Applicant: SUMITOMO WIRING SYSTEMS, LTD., Mie (JP)

(72) Inventors: Seiji Oikawa, Mie (JP); Masataka Wakabayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/274,125

(22) Filed: Sep. 23, 2016

(65) Prior Publication Data

US 2017/0110217 A1 Apr. 20, 2017

(30) Foreign Application Priority Data

Oct. 14, 2015 (JP) .................................. 2015-202865

(51) Int. Cl.
*H02G 3/02* (2006.01)
*H01B 7/00* (2006.01)
*H01B 11/00* (2006.01)

(52) U.S. Cl.
CPC ......... *H01B 7/0045* (2013.01); *H01B 11/002* (2013.01); *H02G 3/02* (2013.01)

(58) Field of Classification Search
CPC ....... H01B 7/0045; H01B 11/002; H02G 3/02
USPC ...................................................... 174/72 A
See application file for complete search history.

(56) References Cited

U.S. PATENT DOCUMENTS

| 6,677,526 | B2 * | 1/2004 | Kishizawa | ........... | H02G 3/0481 |
| | | | | | 174/68.1 |
| 7,118,410 | B2 * | 10/2006 | Hatori | ................ | H01R 13/5833 |
| | | | | | 439/501 |
| 2013/0180777 | A1 * | 7/2013 | Shibata | .................... | H02G 3/02 |
| | | | | | 174/72 A |

FOREIGN PATENT DOCUMENTS

| JP | 08-196016 | 7/1996 |
| JP | 2015-038838 | 2/2015 |

* cited by examiner

*Primary Examiner* — Timothy Thompson
*Assistant Examiner* — Michael F McAllister
(74) *Attorney, Agent, or Firm* — Greenblum & Bernstein, P.L.C.

(57) ABSTRACT

A first electric wire is fastened, in a first frame, by a plurality of first wire hooking ribs provided on upper side edges of an upper thin plate, and by a plurality of second wire hooking ribs provided at lower thin plates, thereby being routed three-dimensionally. A second electric wire is fastened, in a second frame, by a plurality of third wire hooking ribs provided staggered along the upper side edges of the second frame, thereby being routed in a serpentine shape. With the electric wires routed and the second frame accommodated at a predetermined location in a housing space of the first frame, the first electric wire passes below the second electric wire at openings in the structure and passes above the second electric wire at connecting portions in the structure while passing on the connecting portions.

2 Claims, 7 Drawing Sheets

WIRE HARNESS

CROSS-REFERENCE TO RELATED APPLICATIONS

The present application claims priority under 35 U.S.C. §119 of Japanese Application No. 2015-202865, filed on Oct. 14, 2015, the disclosure of which is expressly incorporated by reference herein in its entirety.

BACKGROUND OF THE INVENTION

1. Field of the Invention

The present invention relates to a wire harness required for dealing with electromagnetic noise.

2. Description of Related Art

In recent years, vehicles are equipped with a plurality of various electronics, sensors, and electronic control units (ECU). An ECU controls the electronics and sensors installed in a vehicle. A variety of measures are taken to prevent electromagnetic noise from interfering with the signal lines interconnecting the ECUs and the various electronics and sensors, and the signal lines interconnecting the ECUs (for example, refer to Japanese Patent Laid-open Publication 2015-038838, FIG. 1, paragraphs 0002, 0008).

Japanese Patent Laid-open Publication 2015-038838 discloses a wire harness equipped with twisted pairs where two electric wires are twisted together in a spiral. The twisted pair is sealed with a retainer made of photo-curable resin so that two electric wires are prevented from being relatively displaced. The arrangement prevents the twist from loosening and prevents the wires from separating, which deteriorates the ability of the wire harness to reduce noise.

Many other methods (Japanese Patent Laid-open Publication H8-196016 FIG. 3, and paragraph 0007, for instance) employ a tube-like composite resin protector around the wire harness containing the signal lines, to protect the signal lines routed inside the vehicle from breakage or damage from defective insulation.

Japanese Patent Laid-open Publication H8-196016 discloses a wire harness protector wherein a resin sheet serves as the substrate for the wire harness. The resin sheet is bent into a three-dimensional shape and is capable of retaining this shape. The rectangular substrate is bent along the entire length at locations parallel to each other lengthwise into three parts separated from each other widthwise. The substrate is then assembled into a four-sided tube shape having a central hollow space for inserting a group of electric wires from the wire harness.

However, combining the kind of wire harness described in Japanese Patent Laid-open Publication 2015-038838 that uses a twisted pair wire, the kind of protector described in Japanese Patent Laid-open Publication H8-196016 requires a process for twisting the wires to generate the twisted pair wire The protector must also be secured to the wire harness with tape, requiring another process for assembling the four-sided tube shape. These processes are labor-intensive and inefficient.

SUMMARY OF THE INVENTION

In light of the forgoing problems, aspects of the invention provide a wire harness that makes no use of twisted pair wires but is robust against electromagnetic noise, and is easier to assemble.

A wire harness according to one aspect of the present invention is provided with a first frame including: a rectangular upper thin plate having upper side edges, and openings and connecting portions for routing, the opening and the connecting portions being alternately arranged between the upper side edges; lower thin plates arranged corresponding to and at a predetermined distance below each of the openings; and a pair of side surfaces connecting both sides of each of the lower thin plates to a lower surface of the upper thin plate; a second frame having a length corresponding to the length of the upper thin plate, and a width allowing the second frame to pass between the pair of side surfaces; a first wire routed three-dimensionally by being fastened by a plurality of first wire hooking portions provided on the upper side edges of the upper thin plate and a plurality of second wire hooking portions being provided at the center of each of the lower thin plates; and a second wire routed in a serpentine shape by being fastened by a plurality of third wire hooking portions provided staggered along upper side edges of the second frame, the third wire hooking portions being alternately positioned on one of first and second sides of the plurality of openings when the second frame is housed between the upper thin plate and the lower thin plates of the first frame. The first electric wire passes below the second electric wire at each of the openings, and passes above the second electric wire at each of the connecting portions while passing on the connecting portions. Further, each of the first electric wire and the second electric wire is one of a single signal line and a plurality of signal lines where one of the first and the second electric wires is a positive signal line and the other is a negative signal line.

With this configuration, in a wire harness according to this aspect of the present invention, the first electric wire is three dimensionally routed along a first frame; a second electric wire is routed serpentine through the second frame; and the second frame is housed between the upper thin plate and the lower thin plates of the first frame. In this state, the first electric wire passes beneath the second electric wire at the above-mentioned openings. Additionally, the first electric wire passes below the second electric wire at the openings, and passes above the second electric wire at the connecting portions while passing on the connecting portions. That is, the first electric wire and the second electric wire can have a twist structure without performing the conventional wire twisting process. A noise-resistant wire harness can be easily manufactured at low cost since, with this configuration, it is possible to eliminate the typical labor-intensive processes such as twisting the electric wire, and the like.

The wire harness according to another aspect of the invention is further provided with a locking mechanism configured to secure the second frame when the second frame is accommodated between the upper thin plate and the lower thin plates of the first frame.

With this configuration, the second frame in the wire harness according to this aspect will not shift relative to the first frame, thus enabling precise alignment and ensuring consistent performance of the wire harness in resisting noise.

An embodiment of the invention provides a wire harness that makes no use of twisted pair wires but is robust against electromagnetic noise, and is easier to assemble.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A wire harness according to an embodiment of the present invention is described below with reference to the drawings.

Configuration

Figure 5:
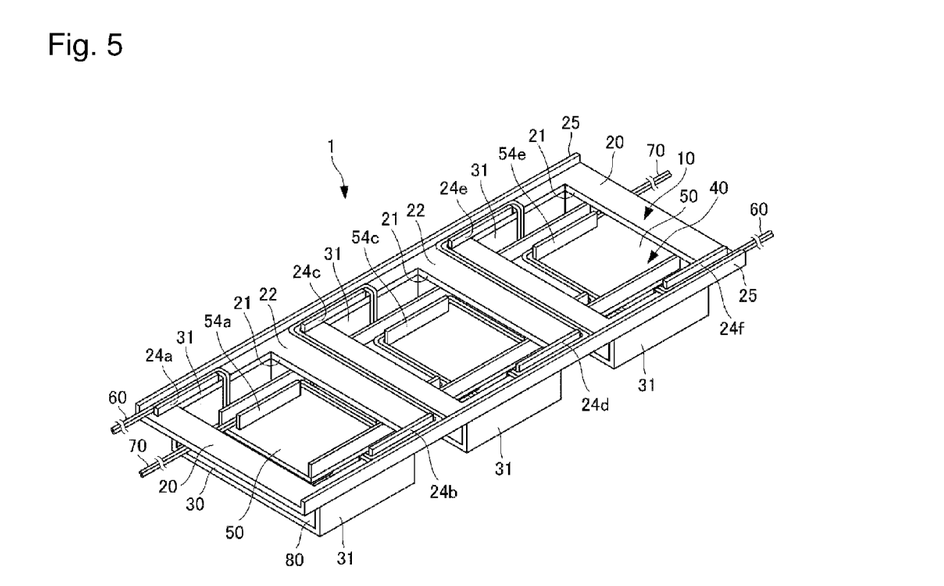
FIG. 5 is a perspective view of a wire harness according to the embodiment of the present invention.
Figure 6A:
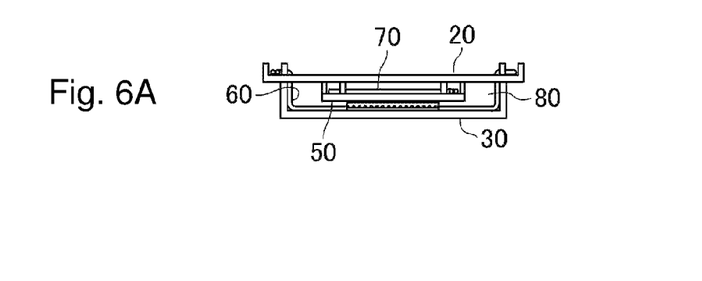
FIG. 6A is a front view of the wire harness illustrated in FIG. 5.
Figure 6B:
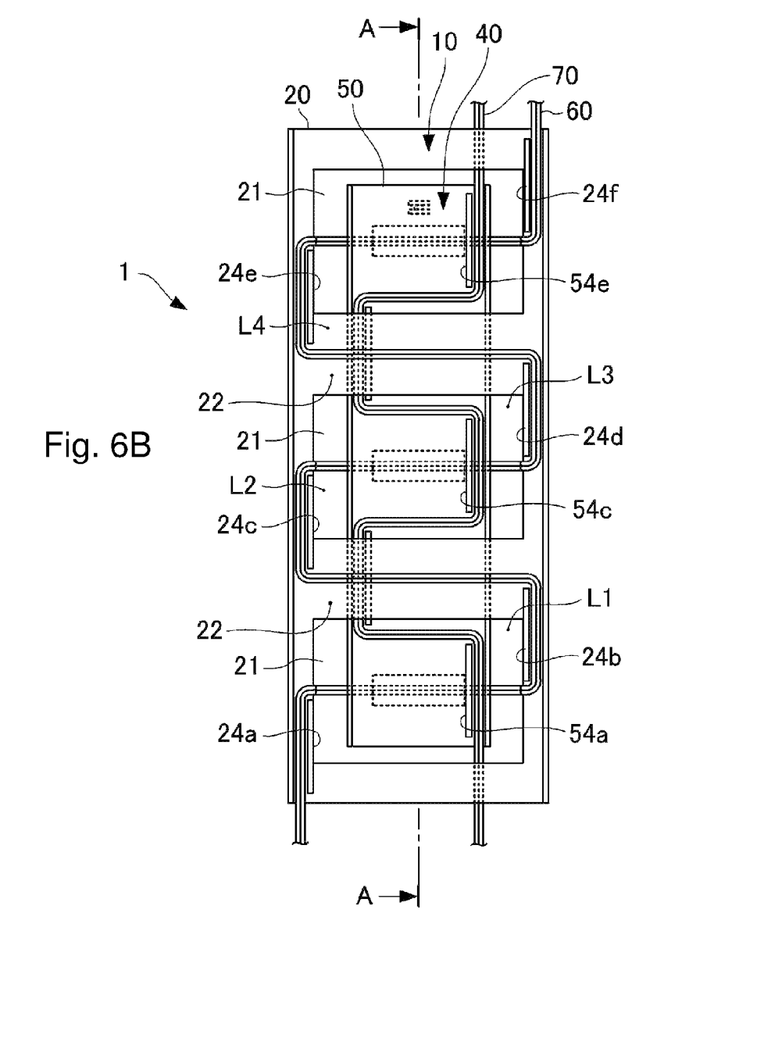
FIG. 6B is a plan view thereof.

A wire harness 1 according to the embodiment is provided with a first frame 10, a second frame 40, a first electric wire 60, and a second electric wire 70 as illustrated in FIG. 5 and FIG. 6.

Figure 1:
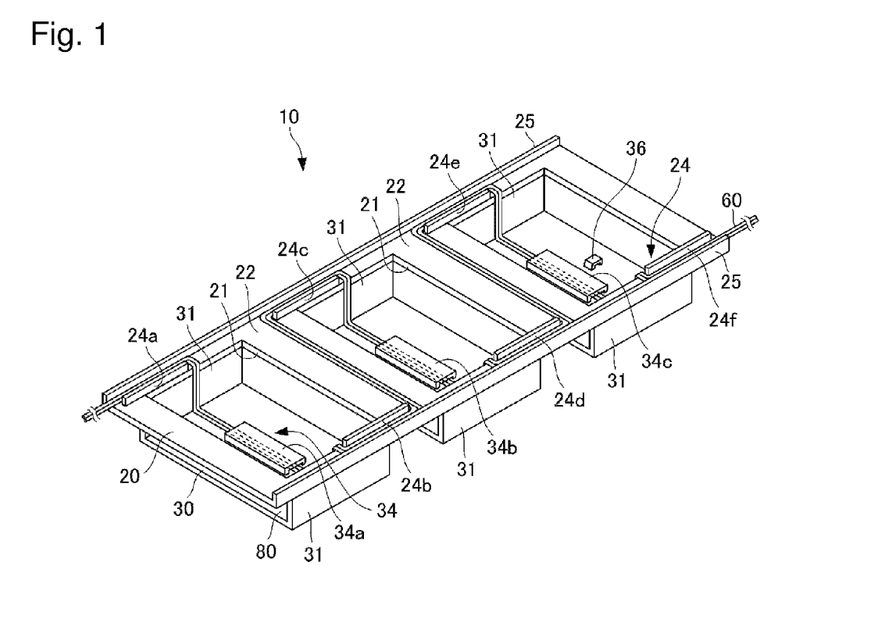
FIG. 1 is a perspective view of a first frame, through which a first electric wire is routed according to an embodiment of the present invention.
Figure 2A:
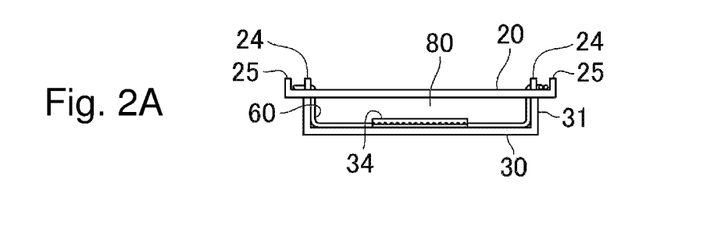
FIG. 2A is a front view of the first frame illustrated in FIG. 1.
Figure 2B:
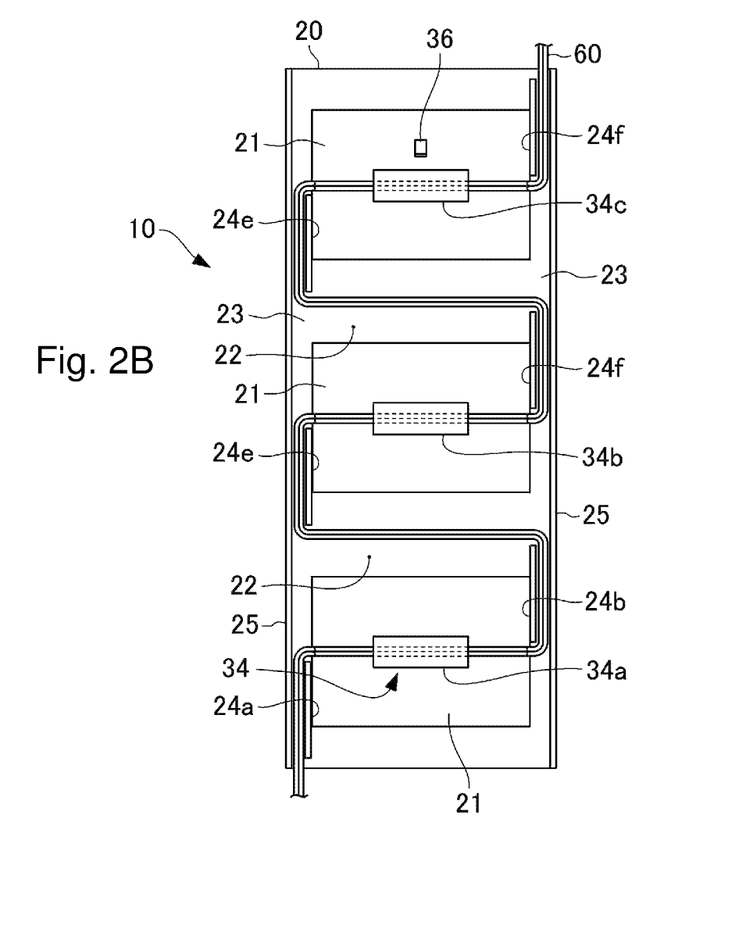
FIG. 2B is a plan view thereof.

As illustrated in FIG. 1 and FIGS. 2A, 2B, the first frame 10 includes an upper thin plate 20, a lower thin plate 30, and a pair of side surfaces 31. The upper thin plate 20 is rectangular and includes openings 21 for wire routing and connecting portions 22 alternately arranged in the area between two upper side edges 23, with the lower thin plate 30 arranged corresponding to and at a predetermined distance below each of the openings 21. Side surfaces 31 connect both sides of each of the lower thin plates 30 to the lower surface of the upper thin plate 20. Although not particularly limited, as an example, the longitudinal length of the first frame 10 is 200 mm, with a 13-25 mm gap between (the centers of) an opening 21 and an adjacent opening 21, for example. The first frame 10 is composed of an insulating composite resin and is formed as an integrally molded component.

As illustrated in FIG. 2A, the first frame 10 includes a housing space 80 between the upper thin plate 20 and the lower thin plates 30 into which a second frame 40 (later described) is accommodated lengthwise.

A plurality of first wire hooking ribs 24 are provided on the upper side edges 23 of the upper thin plate 20 in the first frame 10. A second wire hooking rib 34 is provided at the center of each of the lower thin plates 30. The first wire hooking ribs 24 and the second wire hooking ribs 34 serve as the first wire hooking portions and the second wire hooking portions respectively.

More specifically, the plurality of first wire hooking ribs 24 are provided staggered along the length direction of the upper thin plate 20. In other words, the first wire hooking ribs 24 are alternately arranged along one of the upper side edges 23 at a position corresponding to an opening 21 used for routing the wires. The first wire hooking rib 24 extends along the upper side edges 23, and has an outward-facing hook-shaped cross-section. The electric wire can be easily routed in the harness by fastening the electric wire with the hook-shaped portions.

Figure 7:
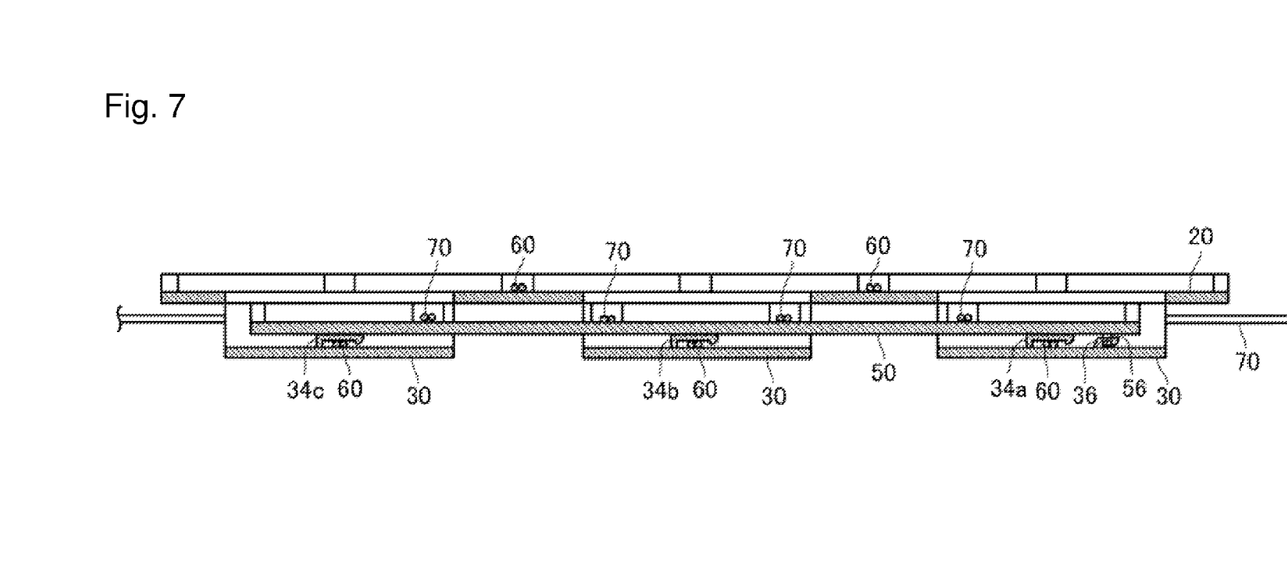
FIG. 7 is a cross-sectional view of A-A in FIG. 6B.

Further, the second wire hooking rib 34 is provided at the center of each lower thin plate 30 corresponding to the openings 21 used for routing the wire. The second wire hooking rib 34 extends along the width direction of the first frame 10, and includes a hook shaped cross-section (see FIG. 7). The electric wire can be easily routed in the harness by fastening the electric wire with the hook-shaped portions.

Figure 3:
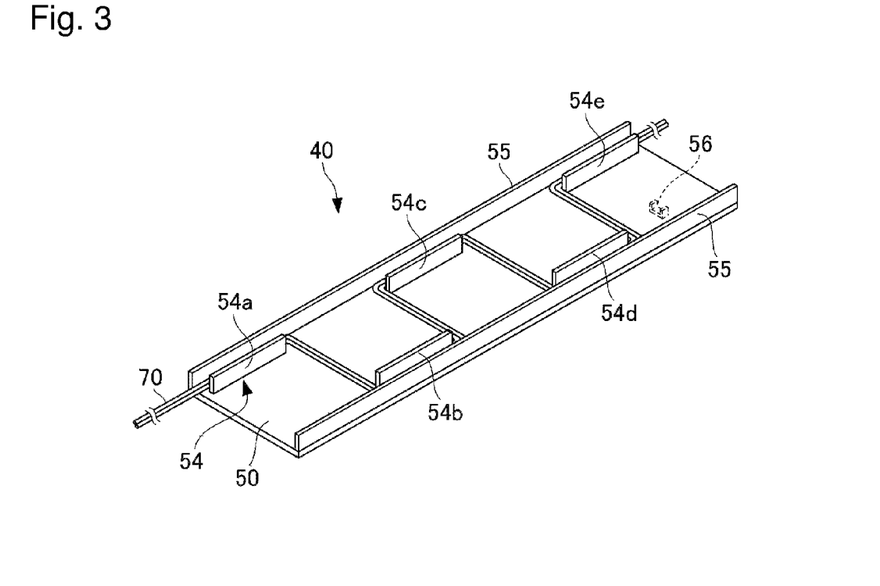
FIG. 3 is a perspective view of a second frame, through which a second electric wire is routed according to the embodiment of the present invention.
Figure 4A:
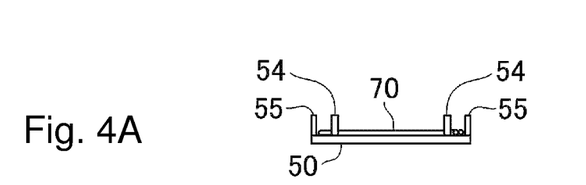
FIG. 4A is a front view of the second frame illustrated in FIG. 3.
Figure 4B:
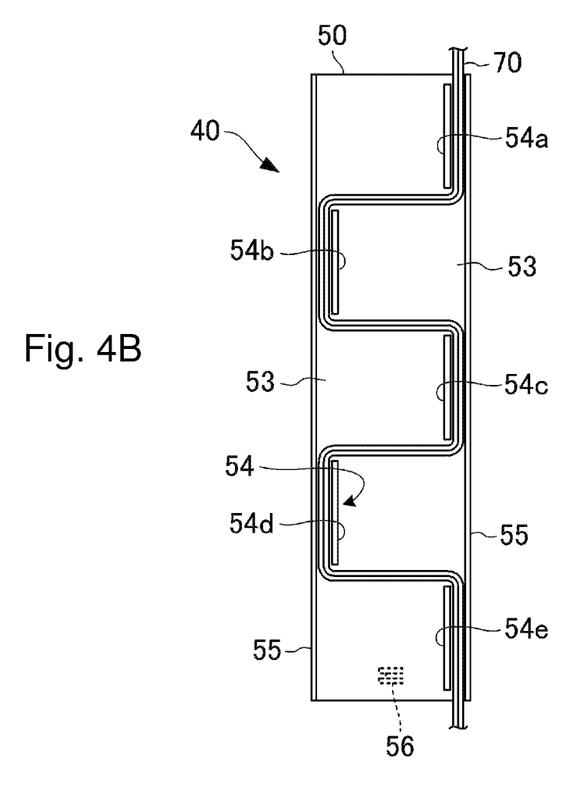
FIG. 4B is a plan view thereof.

As illustrated in FIG. 3 and FIG. 4A, 4B, the second frame 40 includes a rectangular thin plate 50. The thin plate 50 is configured so that the length thereof corresponds to the length of the upper thin plate 20 on the first frame 10, while the width allows the second frame 40 to pass between the pair of side surfaces 31. The second frame 40 is composed of an insulating composite resin and is formed as an integrally molded component.

A plurality of third wire hooking ribs 54 are provided in the second frame 40 to serve as a plurality of third wire hooking portions. The third wire hooking ribs 54 are staggered on the upper side edges 53 of the second frame 40.

More specifically, the plurality of third wire hooking ribs 54 are provided staggered on the upper surface along the length of the thin plate 50. In other words, the third wire hooking ribs 54 are alternately arranged along one of the upper side edges 53. The third wire hooking rib 54 extends along the upper side edges 53, and has an outward-facing hook-shaped cross-section. The electric wire can be easily routed in the harness by fastening the electric wire with the hook-shaped portions.

As illustrated in FIG. 6B, the plurality of third wire hooking ribs 54 are arranged so that the third wire hooking ribs 54 are alternately positioned on one of first and second sides of the plurality of openings 21 when the second frame 40 is accommodated between the upper thin plate 20 and the lower thin plates 30 of the first frame 10. With this configuration, after the first electric wire 60 and the second electric wire 70 are routed, the first and second electric wires 60, 70 form closed loops L1, L2, L3, L4 of uniform surface area in a plan view when the second frame 40 is accommodated between the upper thin plate 20 and the lower thin plates 30 of the first frame 10. For instance, consider the locations in the plan view in FIG. 6B where the first electric wire 60 and the second electric wire 70 intersect. A "closed loop" is a virtual closed loop formed from the portion of the first electric wire 60 and the portion of the second electric wire 70 that are between adjacent intersections.

The first electric wire 60 and the second electric wire 70 are one of a single signal line and a plurality of signal lines, where one electric wire is positive and the other electric wire is negative. A positive signal line transmits signals via a current flowing in a predetermined single direction. A negative signal line transmits signals via a current flowing in the direction opposite the current flow in the positive signal line. Accordingly, current flows in a predetermined single direction in the one of a single and a plurality of signal lines configuring the first electric wire 60 during signal transmission. Current also flows in a direction opposite the above-mentioned predetermined single direction in the one of a single and a plurality of signal lines configuring the second electric wire 70, during signal transmission.

The first electric wire 60 is fastened to the first wire hooking ribs 24 provided on the upper side edges 23 of the upper thin plate 20, and to the second wire hooking rib 34 provided at the center of each of the lower thin plates 30 positioned underneath at a predetermined distance. Hereby the first electric wire 60 is routed three-dimensionally as illustrated in FIG. 1 and FIGS. 2A, 2B.

The second electric wire 70 is fastened to the plurality of third wire hooking ribs 54 provided staggering along the upper side edges 53 of the second frame 40. Hereby the second electric wire 70 is routed in a serpentine shape as illustrated in FIG. 3 and FIGS. 4A, 4B.

As illustrated in FIG. 5 and FIGS. 6A, 6B, with the electric wires routed and the second frame 40 accommodated in between the upper thin plate 20 and the lower thin plates 30 in the first frame 10, the first electric wire 60 passes below the second electric wire 70 at each of the openings 21 and passes above the second electric wire 70 at the connecting portions 22 while passing on the connecting portions 22. In other words, the first electric wire 60 and the second electric wire 70 are routed into a twist structure.

The wire harness 1 according to the embodiment may also be configured with a locking mechanism. The locking mechanism secures the second frame 40 while the second frame 40 is accommodated in the housing space 80 between upper thin plate 20 and the lower thin plates 30 in the first frame 10.

More specifically, the locking mechanism is configured with a lock receiver 56 integrally formed with the lower surface of the thin plate 50 in the second frame 40, and a lock projection 36 integrally formed with the upper surface of the lower thin plates 30 in the first frame 10. The elastic deformation of the lock projection 36 allows the lock projection to enter the lock receiver 56 to thereby locking the frames together.

In more concrete terms, two components extend downward from the lower surface of the thin plate 50. The tip ends of these components are connected via a single horizontal component to form a rectangular receiver opening. The lock projection 36 is an L-shaped component that extends upward from the upper surface of the lower thin plate 30 and then extends horizontally rearward. The horizontal portion has a slightly ballooned tip end. When the second frame 40 is inserted in the length direction into the housing space 80 (see FIG. 2A), the ballooned tip end of the lock projection 36 rides over and past the horizontal component of the lock receiver 56 and enters the receiver opening; the engagement of the lock projection into the lock receiver secures accommodation of the second frame 40 in the first frame 10.

A single lock receiver 56 is provided at the center (widthwise) on a first end of the thin plate 50 of the second frame 40. A single lock projection 36 is provided at the center (widthwise) on the upper surface of a lower thin plate 30 of the first frame 10 at the first end to correspond to the lock receiver 56. However, a desired number of lock receivers 56 and lock projection 36 may be provided; the number of lock receivers 56 and lock projection 36 is not limited to one. The lock receiver 56 and the lock projection 36 are not limited to arrangement on the first end of the thin plate 50 and the first end of a lower thin plate 30, respectively. Any desired arrangement may be used, as long as the lock receiver 56 and the lock projection 36 are formed to correspond to each other. The lock receiver may be formed on the first frame 10 and the lock projection can be formed on the second frame 40.

Further, for the locking mechanism, the second frame 40 may be made from a shape-memory resin. An existing method of shape memory may be used to memorize a lock protrusion on the second frame 40 in advance, the protrusion fitting into an opening 21 in the first frame 10. While the second frame 40 is in the housing space 80 in the first frame 10, the second frame 40 is heated to a required temperature in order to restore the shape of the lock protrusion. This causes the restored lock protrusion to engage into the opening 21 and secures frames together. In this case, the lock projection 36 on the first frame 10 and the lock receiver 56 on the second frame 40 are not required.

Assembling the Wire Harness

A method of assembling a wire harness 1 according to this embodiment is described next.

The signal lines having metal terminals attached to both ends thereof are sorted into positive signal lines (e.g., the first electric wire 60) and negative signal lines (e.g., the second electric wire 70). The first electric wire 60 and the second electric wire 70 are bundled with adhesive tape at a plurality of locations.

The first electric wire 60 is fastened to one of the plurality of first wire hooking ribs 24 provided staggered along the upper side edges 23 of the upper thin plate 20 of the first frame 10. The first electric wire 60 is then dropped through an opening 21 used for routing and is fastened to a second wire hooking rib 34 provided at the center of a lower thin plate 30. Thereafter, the first electric wire 60 is raised and then fastened to the next first wire hooking rib 24. This process is repeated a plurality of times to route the first electric wire three-dimensionally.

More specifically, as illustrated in FIG. 1 and FIGS. 2A, 2B, the first electric wire 60 is dropped along the side surface 31 after being fastened to a first wire hooking rib 24a, and is then fastened to a second wire hooking rib 34a. The first electric wire 60 is then raised along the opposite side surface 31 and is fastened to the first wire hooking ribs 24b, 24c in that order. The first electric wire 60 is then dropped along the side surface 31, is fastened to the second wire hooking rib 34b, and is raised along the opposite side surface 31. The first electric wire 60 is then fastened to the first wire hooking ribs 24d, 24e similarly in that order. Subsequently, the first electric wire 60 is dropped along the side surface 31 and is fastened to the second wire hooking rib 34c; the first electric wire 60 is then raised along the opposite side surface 31 and is fastened to the first wire hooking ribs 24f. Thus, the first electric wire is routed three-dimensionally in a roughly spiral shape lengthwise while appearing to meander lengthwise in a plan view.

In the above description, the routing begins at a first wire hooking rib 24a on one end. However, the routing can begin at a first wire hooking rib 24f on the opposite end and proceed in the opposite direction. The routing can also start at the middle at the first wire hooking rib 24c, for instance, and proceed toward both ends.

Next, the second electric wire 70 is fastened to the plurality of third wire hooking ribs 54 provided staggered along the upper side edges 53 on the thin plate 50 of the second frame 40. Hereby the second electric wire 70 is routed serpentine lengthwise on the thin plate 50. For instance, as illustrated in FIG. 3 and FIGS. 4A, 4B, the second electric wire 70 is fastened, in order, to the third wire hooking ribs 54a, 54b, 54c, 54d, 54d or alternatively, in the opposite order, to thereby route the second electric wire 70 in a serpentine pattern.

The first electric wire and the second electric wire 70 are now routed on the first frame 10 and the second frame 40, respectively. As illustrated in FIG. 5 and FIGS. 6A, 6B, the second frame 40 is then inserted lengthwise into the housing space 80 that is between the upper thin plate 20 and the lower thin plates 30 of the first frame 10. The lock projection 36 on the first end of the upper surface of the lower thin plates 30 fits into the lock receiver 56 provided on the first end of the lower surface of the thin plate 50 when the second frame is positioned and accommodated at a predetermined location in the housing space 80 in the first frame 10. The second frame is thereby secured and the assembly process is complete.

According to the embodiment of the wire harness 1, a first frame 10 accommodates a second frame 40 in a housing space 80 located between the upper thin plate 20 and the lower thin plates 30 of the first frame 10. In this state, third wire hooking ribs 54 are alternately positioned on one of first and second sides of a plurality of opening 21 wherethrough routing takes place in the wire harness 1. The first electric wire 60 passes below the second electric wire 70 at the openings 21, and passes above the second electric wire 70 at the connecting portions 22 while passing on the connecting portions 22. In other words, this forms a twist structure where the first electric wire 60 and the second electric wire twist around each other.

Consequently, in a plan view, the first electric wire 60 and the second electric wire 70 form four closed loops L1, L2, L3, and L4 of the same surface area, as illustrated in FIG. 6B. Assuming a magnetic flux that changes with time is present along a direction perpendicular to the drawing sheet FIG. 6B, the changing magnetic flux passing through one of the closed loops induces an electromotive force in the electric wire. The electromotive force induced by the changing magnetic flux passing through the adjacent closed loop moves in the opposite direction. Therefore, this structure increases resistance to external electromagnetic noise.

In FIG. 6B, a portion of the second electric wire 70 that crosses widthwise from a third wire hooking rib 54 on one upper side edge 53 to a third wire hooking rib 54 on the other upper side edge 53 is positioned at the middle between a portion of the first electric wire 60 crossing an opening 21 widthwise, and a portion of the first electric wire 60 crossing the adjacent connecting portion 22. However, the second electric wire 70 is not limited to this arrangement.

For instance, a portion of the second electric wire 70 that crosses widthwise from a third wire hooking rib 54 on one upper side edge 53 to a third wire hooking rib 54 on another upper side edge 53 may appear to overlap, in a plan view, a portion of the first electric wire 60 crossing an opening 21 widthwise, or a portion of the first electric wire 60 crossing on the adjacent connecting portion 22. When configured in this manner, the surface area of the closed loop formed by the first electric wire 60 and the second electric wire 70 decreases in a plan view, and thus, the wires tend to not be affected by external electromagnetic noise along the direction perpendicular to the drawing sheet of FIG. 6B.

In a plan view, the meander pitch of the first electric wire 60 and the meander pitch of the second electric wire 70 are preferably equivalent to reduce the surface area of the closed loop formed by the first electric wire 60 and the second electric wire 70 in FIG. 6B. Without being limited to this configuration, however, the meander pitches for the electric wires may differ. For instance, the ratio of the meander pitch of the first electric wire 60 to the meander pitch of the second electric wire 70 may be 1:2.

It is preferable to reduce the height of the side surfaces 31 while securing the required housing space 80 in order to reduce the influence of external electromagnetic noise from a direction perpendicular to the drawing sheet of FIG. 6A.

As above described, in the wire harness 1 according to the embodiment: the first electric wire 60 is three dimensionally routed along the first frame 10; the second electric wire 70 is routed meandering through the second frame 40; and the second frame 40 is housed between the upper thin plate 20 and the lower thin plates 30 of the first frame 10. In this state, the first electric wire 60 passes below the second electric wire 70 at the openings 21 and passes above the second electric wire 70 at the connecting portions 22 while passing on the connecting portions 22. That is, an incredibly simple assembly process is provided wherein the second frame 40 is inserted in the housing space 80 in the first frame 10 after fastening and wiring the electric wires across the first through third wire hooking ribs 24, 34, 54 in the first frame 10 and the second frame 40 respectively. This incredibly simple assembly process produces a twist structure in the electric wires. The combination of the first frame 10 and the second frame 40 also protects the electric wires. In this manner, the wire harness 1 is easier to assemble because the processes of twisting the electric wires to create the conventional twisted pair wires, and taping the assembly to the protector can be eliminated. Furthermore, the wire harness 1 is more robust against noise.

The wire harness 1 according to the embodiment includes a locking mechanism. The locking mechanism secures the second frame 40 when the second frame 40 is accommodated in the housing space 80 between the upper thin plate 20 and the lower thin plates 30 of the first frame 10. The locking mechanism can be configured with a lock receiver 56 on the lower surface of the thin plate 50 of the second frame 40 and a lock projection 36 on the upper surface of a lower thin plate 30 in the first frame 10. The second frame 40 is inserted longitudinally into the housing space 80. The lock receiver 56 and the lock projection 36 are configured to fit together to thereby secure the second frame 40 in its housed state. With this configuration, the second frame 40 can be placed precisely in relation to the first frame 10 in the wire harness 1, ensuring that the relative positioning of the components does not change once the components are placed. Thus, the twist structure can be simply and precisely configured. The twist structure also ensures consistent performance of the wire harness in resisting noise.

As above described a wire harness according to embodiments of the invention makes no use of twist pair wires, but is robust against electromagnetic noise and is easier to assemble. This wire harness is broadly useful in the electromagnetically noisy environments where wire harnesses are generally used.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A wire harness comprising:
a first frame including: a rectangular upper thin plate having upper side edges, and openings and connecting portions for routing, the opening and the connecting portions being alternately arranged between the upper side edges; lower thin plates arranged corresponding to and at a predetermined distance below each of the openings; and a pair of side surfaces connecting both sides of each of the lower thin plates to a lower surface of the upper thin plate;
a second frame having a length corresponding to the length of the upper thin plate, and a width configured to allow the second frame to pass between the pair of side surfaces of the first frame;
a first wire routed three-dimensionally by being fastened by a plurality of first wire hooking portions provided on the upper side edges of the upper thin plate and a plurality of second wire hooking portions provided at the center of each of the lower thin plates; and
a second wire routed in a serpentine shape by being fastened by a plurality of third wire hooking portions provided staggered along upper side edges of the second frame, the third wire hooking portions being alternately positioned on one of first and second sides of the plurality of openings when the second frame is housed between the upper thin plate and the lower thin plates of the first frame,
wherein the first electric wire passes below the second electric wire at each of the openings, and passes above the second electric wire at each of the connecting portions while passing along the connecting portions; and
each of the first electric wire and the second electric wire is one of a single signal line and a plurality of signal lines, where one of the first and the second electric wires is a positive signal line and the other is a negative signal line.

2. The wire harness according to claim 1, further comprising:
a locking mechanism configured to secure the second frame accommodated between the upper thin plate and the lower thin plates of the first frame.

* * * * *